United States Patent [19]

Harris

[11] Patent Number: 4,979,327
[45] Date of Patent: Dec. 25, 1990

[54] ANIMAL TRAP

[76] Inventor: Edmond H. Harris, 53237 C.R. 9 North, Elkhart, Ind. 46514

[21] Appl. No.: 448,520

[22] Filed: Dec. 11, 1989

[51] Int. Cl.⁵ ............................................. A01M 23/02
[52] U.S. Cl. ....................................................... 43/61
[58] Field of Search ..................... 43/61, 60, 67, 58, 72

[56] References Cited

U.S. PATENT DOCUMENTS

| | | | |
|---|---|---|---|
| 1,231,782 | 7/1917 | Patterson | 43/72 |
| 1,320,844 | 11/1919 | Cooper | 43/72 |
| 1,355,264 | 10/1920 | Reppl | 43/72 |
| 2,471,540 | 5/1949 | Phillips | 43/71 |
| 4,231,180 | 11/1980 | Bare | 43/61 |
| 4,291,486 | 9/1981 | Lindley | 43/62 |

Primary Examiner—Kurt Rowan
Assistant Examiner—James Miner
Attorney, Agent, or Firm—John J. Gaydos

[57] ABSTRACT

Animal trap includes an elongated outer shell having an entrance at one end and a removable end plate at the other end for enclosing the shell and for receiving bait and supported at an acute angle to the horizontal with a pair of legs. An inner shell rotatably supported in the outer shell is provided with a trap door in registry with the entrance. Longitudinal movement of the inner shell with respect to the outer shell by an animal trips an actuating member and rotates the trap door of the inner shell closing the entrance to the trap.

9 Claims, 1 Drawing Sheet

U.S. Patent  Dec. 25, 1990  4,979,327
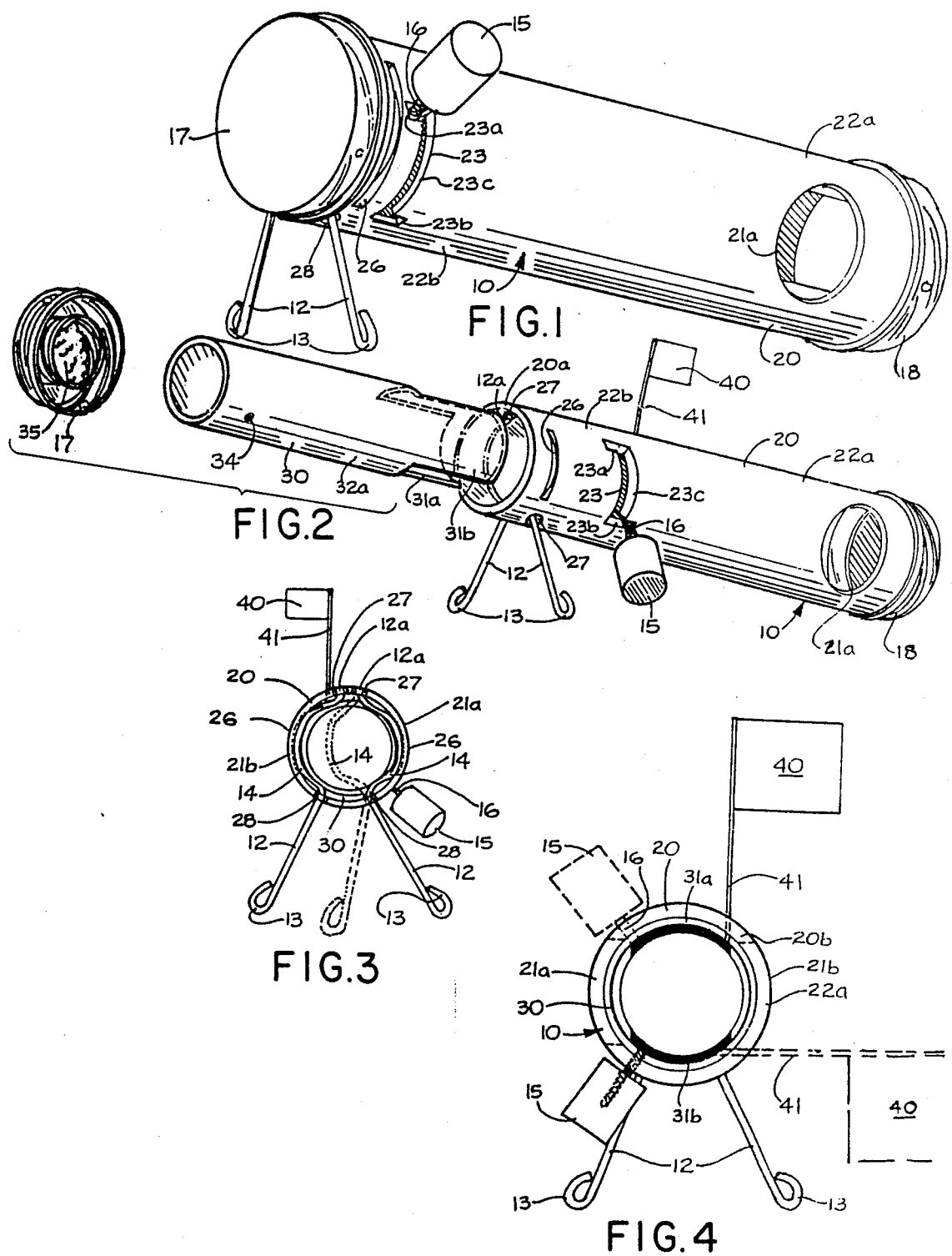

ANIMAL TRAP

The present invention relates to an animal trap, and, more particularly, to an improved animal trap for capturing instead of killing the animal.

Generally, animal traps of the type for keeping a captured animal alive comprise a cage provided with a trap door at one end thereof and a bait for attracting the animal at the other end thereof. As soon as the animal enters the cage and starts nibbling on the bait, an actuating member triggers the trap door and closes the passageway initially permitting exiting from the cage thereby capturing the animal. One of the difficulties with such type of animal trap is that the environment, generally, with passage of time, affects the operation of the trap making it more difficult to actuate the trap unless the trap is continually maintained in optimum operating condition. Further, whenever a smaller animal than desired enters the trap, the smaller animal can nibble at the bait without tripping the actuating means and closing the trap door. It would, therefore, be desirable to provide an animal trap that is simple in construction, requires little or no maintenance and does not deteriorate when exposed to the environment.

Accordingly, it is an object of the present invention to provide a new and improved animal trap of the character described above.

Another object of the present invention is to provide a new and improved animal trap which obviates the above-described disadvantages of the prior art devices.

A further object of the present invention is to provide a new and improved animal trap embodying a novel structural assembly of an outer shell and an inner shell containing a rotatable trap door actuated upon slight longitudinal movement of the inner shell with respect to the outer shell.

Still another object of the present invention is to provide a new and improved animal trap that can be made in various sizes to accommodate the size of animal being trapped.

An additional object of the present invention is to provide removal of the captured animal from the trap in a simple and facile manner.

An additional object of the present invention is to provide a new and improved animal trap that can be used outside or inside of a barn, farmhouse or dwelling any time of the year.

Still another object of the present invention is to provide a new and improved animal trap that is safe around children and domestic pets because the trap operates only by force of gravity after the animal has entered the trap and has tripped the actuating means.

A still further object of the present invention is to provide a new and improved animal trap that does not endanger the fingers or hand of the person setting the trap.

The invention further resides in various structural improvements and innovations in the animal trap by virtue of efficiency and simplicity of operation combined with sturdiness, of which the structural features may be particularly mentioned, the novel manner in which the animal trap can be shipped, assembled and disassembled for storage, the ease of setting the actuating means for trapping an animal, and the low manufacturing cost.

Further objects and advantages of the present invention will become apparent as the following description proceeds, and the features of novelty characterizing the invention will be pointed out with particularity in the claims annexed to and forming a part of this specification.

For a better understanding of the present invention, reference may be had to the accompanying drawings wherein the same reference numerals have been applied to like parts and wherein:

FIG. 1 is a prospective view of an animal trap actuated for trapping an animal and embodying the features of the present invention;

FIG. 2 is a partially exploded view of the animal trap shown in FIG. 1 of the drawings except that the actuator has been tripped;

FIG. 3 is a front view of the animal trap shown in FIG. 1 with the front cap removed and showing the inner shell of the trap in the tripped position closing the passageway exiting from the trap; and FIG. 4 is a rear view of the animal trap shown in FIG. 1 with both front and rear caps removed and showing the location of the trap doors with respect to the passageway when the trap is actuated for capturing an animal.

In summary, to accomplish the foregoing and other objects of the present invention, there is provided an animal trap generally comprising an outer shell having diametically opposed entrances at the rear end portion thereof. An elongated inner shell rotatably supported in the outer shell contains a pair of trap doors extending rearwardly in angular relationship to the opposed entrances in the outer shell. In order to actuate the trap, a substantially Z-shaped slot is provided in the front end portion of the outer shell and a rod secured to the front end portion of the inner shell extends outwardly through the slot and a slug is secured to the outer end of the rod. By placing the rod and the slug in the upper forward portion of the Z-shaped slot, the animal trap is actuated or set for capturing an animal.

An animal enters the trap through one of the entrances provided in the outer shell and then walks toward the front of the animal trap arriving at a bait or other means provided in the front end portion of the trap. The animal then starts nibbling on the bait and by moving its feet against the front edge of the inner shell releases a trigger, i.e., the slug and rod, causing the inner shell to slide rearwardly thereby removing the rod from the upper portion of the slot into the center portion of the slot and by force of gravity the slug causes the inner shell to rotate until the rod engages the lower portion of the Z-shaped slot positioning the trap doors in front of the entrances and preventing the animal from escaping from the trap. In order to facilitate rearward movement of the inner shell, the outer shell is provided with support means attached to the front end of the outer shell for supporting the outer shell at an acute angle with respect to a horizontal supporting surface. Detachable end caps enclose the front and rear ends of the outer shell. A flag can also be secured to the trap for signaling a viewer when an animal has been captured in the trap.

Referring now to the drawings, an animal trap 10 shown in FIGS. 1-4 of the drawings, comprises an outer shell 20 of elongated cylindrical shape open at both ends 20a, 20b and an inner shell 30 also of elongated cylindrical shape, both shells preferably being made from a suitable material such as plastic. As more particularly shown in the drawings, the outer shell 20 is provided with a pair of cylindrical diametrically opposed openings or entrances 21a, 21b at the rear end portion 22a and a Z-shaped slot 23 is provided at the elevated or front end portion 22b of the outer shell 20 for setting the trap. The Z-shaped slot 23 comprises an upper portion 23a, a lower portion 23b, and a central portion 23c. The inner shell 30 having an outer diameter slightly smaller than the inner diameter of the outer shell 20 and of a length slightly less than that of the outer shell 20 is rotatably supported in the outer shell 20. Although the outer shell 20 and the inner shell 30 preferably are made from the same plastic material, obviously metal can be substituted for either shell.

In accord with the present invention and as best seen in FIG. 2 of the drawings, the inner shell 30 is provided with a pair of diametrically opposed trap doors 31a, 31b or closure means at the rear end portion 32a and disposed at approximately 90 degrees with respect to the openings 21a, 21b in the outer shell 20 when the trap 10 is set or actuated to receive an animal. The trap doors 31a, 31b are formed in the inner shell 30 by providing two slots in the rear end portion of the shell as best seen in FIG. 4 of the drawings. Each of the trap doors 31a, 31b subtend an arc of approximately 90 degrees, and the width of each trap door is sufficient to enclose completely the entrances 21a, 21b. Operational tests have revealed that the animal trap 10 functions at optimum conditions for actuation by an animal when the trap 10 is supported at a slight angle to the horizontal with a pair of legs 12 the legs having curved feet 13 and arcuate portions 14 secured to the outer shell 20, as best shown in FIG. 3 of the drawings. A slug 15 extending radially outwardly from the front end portion 22b of the outer shell 20 is secured to the inner shell 30 in a threaded hole 34 by means of a rod 16 or other suitable member passing through the Z-shaped slot 23. The slug 15 is of sufficient weight to cause rotation of the inner shell 30 in the outer shell 20 when actuated by an animal and the length of the central portion 23c of the Z-shaped slot 23 controls rotation of the closure means 31a, 31b through a sufficient angle to close the entrances 21a, 21b to the outer shell 20.

Preferably and in accord with the present invention, tests have revealed that the outer cylinder 20 should form an acute angle with a horizontal plane, the optimum angle being approximately 12 degrees from the horizontal. As can be readily appreciated, if the angle is increased beyond 12 degrees or to a substantial angle, it becomes difficult to set the cylinder 30 in the forward position for maintaining the trap doors 31a, 31b above and below the entrances 21a, 21b in the rear of the outer shell 20. On the other hand, if the angle is decreased substantially to virtually zero (0), then substantial force is required by the animal to move the inner shell 30 longitudinally rearwardly before triggering the actuating means for moving the inner shell 30 in the outer shell 20 and causing the trap doors to rotate and close the entrances in the outer shell for capturing the animal in the trap 10.

The legs 12 made from wire or other suitable plastic material and employed for elevating the front end portion 22b of the outer shell at an acute angle facilitate sliding movement of the inner shell 30 in the outer shell 20 when an animal engages the front end portion 32b of the inner shell 30 with its paws when nibbling at a bait 35 disposed in the trap. According to the present invention, the central arcuate portion 14 of each leg 12 is located in a groove 26 provided in the inner front portion of the outer shell 20 and the end 12a of the leg 12 projects through an opening 27 provided in the lower front portion thereof to facilitate packaging and assembly of the trap 10. The legs 12 can be readily removed from the outer shell 20 by rotating each of the legs 12 a few degrees to remove the central arcuate portions from the grooves 26 and then withdrawing the arcuate portions 14 from a pair of holes 28 located in the bottom portion of the outer shell 20.

Preferably and in accord with the present invention, the outer and inner shells 20, 30 are made from cylindrical tubes cut to the desired length. A pair of end caps or plates 17, 18 are secured to the front and rear openings of the outer shell 20 by suitable means, such as by providing threads in the ends of the outer shell 20 or by providing detent means on the end plates for fixedly securing the end plates 17, 18 to the outer shell 20.

As can be readily seen from the drawings and in accord with the present invention, the animal trap, after being assembled in a simple and facile manner can be set for capturing an animal by merely rotating the slug 15 projecting outwardly from the Z-shaped slot to the upper position and then moving the rod 16 connecting the weight to the inner shell 30 forwardly until the rod 16 rests in the upper portion of the Z-shaped slot. As best seen in FIG. 2 of the drawings, the bait 35, depending on the animal desired to be trapped, is secured to the inside of the front end plate. An animal smelling the bait enters the trap 10 through either of the entrances 21a, 21b in the rear of the outer shell 20 and climbs forwardly toward the bait. When the animal starts nibbling on the bait 35 and moves its paws slightly against the front portion of the inner shell 30, the inner shell 30 slides rearwardly thereby moving the rod 16 carrying the slug 15 to the central portion of the Z-shaped slot 23. Gravity then causes the slug to fall downwardly and rotates the inner shell 30 through a sufficient angle to position the closure means 31a, 31b in front of the entrances 21a, 21b at the rear of the outer shell 20. When the rod 16 reaches the lower portion of the Z-shaped slot 23, the inner shell 30 continues to move rearwardly, thereby causing the rod to move into the lower rear portion 23b of the Z-shaped slot 23 thereby locking the inner shell 30 with respect to the outer shell 20 from further rotation and preventing the animal from exiting the trap 10.

Although the animal trap 10 has been shown with a pair of entrances 21a, 21b in the rear end portion 22a of the outer shell 20 and the inner shell 30 is provided with a pair of closure means 31a, 31b, it is to be understood that only one entrance is necessary for permitting an animal to enter into the trap 10. Further, although the inner shell 30 comprises a elongated cylindrical shell member, it is to be understood that the inner shell can comprise arcuate portions secured together and supported in the outer shell 20 solely to facilitate rotation of the trap doors 31a, 31b of the inner shell 30 after it is moved longitudinally rearwardly by the animal.

From the above description, it will be apparent by visual inspection that a flag 40 secured to the inner shell 30 in the vertical position will readily indicate that an animal has been captured inside of the trap. A pole 41 connects the flag 40 to the inner shell 30 and projects through a vertical slot provided in the outer shell 20. Depending upon the person using the trap, the bait 35 can be of a poisonous type for killing the animal after it has eaten a small portion of the bait, or else the animal can be kept alive. For example, small rodents such as a chipmunk and other similar animals can be sold to zoos or other facilities desiring live animals.

In view of the detailed description included above, the operation and assembly and disassembly of the present invention will readily be understood by those skilled in the art and no further discussion thereof is included herewith.

While there has been shown and described a particular embodiment of the present invention, it will be apparent to those skilled in the art that various modifications may be made without departing from the invention in its broader aspects, and it is, therefore, aimed in the appended claims to cover all such changes and modifications which fall within the true spirit and scope of the present invention.

The invention claimed is:

1. An animal trap comprising an elongated outer shell having a front end portion and a rear end portion and including means at the rear end portion thereof defining an entrance, an inner shell rotatably supported in the outer shell and having a front end portion and a rear end portion and open at the front end portion, closure means connected to and disposed at the rear end portion of the inner shell, weight means secured to the inner shell and extending laterally outwardly therefrom for positioning the inner shell with respect to the outer shell in a first or second position, actuating means for rotating the inner shell from the first to the second position upon longitudinal movement of the inner shell with respect to the outer shell and simultaneously positioning the closure means in front of the entrance to the outer shell thereby closing the entrance, means enclosing the front end portion and the rear end portion of the outer shell, and means for securing a bait in the front end portion of the outer shell.

2. The animal trap of claim No. 1, further comprising means secured to the outer shell for supporting the outer shell at an acute angle with respect to a horizontal supporting surface.

3. The animal trap of claim No. 2, wherein the means supporting the front end portion of the outer shell comprises a pair of legs, each of the legs having an upper section and a lower section, the front end portion of the outer shell being provided with a pair of radially disposed grooves in the inner surface thereof and with a pair of spaced downwardly disposed holes, the upper sections of the legs being received in the grooves and the lower sections of the legs extending through the holes provided in the front end portion of the outer shell thereby supporting the outer shell at an acute angle with respect to the horizontal supporting surface.

4. The animal trap of claim No. 1, wherein the actuating means includes a substantially Z-shaped slot provided in the front end portion of the outer shell, the Z-shaped slot having an upper portion extending forwardly and away from the entrance of the outer shell, a central arcuate portion disposed substantially transversely to the longitudinal axis of the outer shell, and a lower portion extending rearwardly and toward the entrance of the outer shell, the weight means extending outwardly from the slot whereby upon placing the weight means in the first position and in the upper portion of the slot the closure means is disposed radially to the entrance and upon movement rearwardly of the inner shell with respect to in the outer shell the weight means moves from the upper portion of the slot into the central arcuate portion of the slot and by force of gravity toward the lower portion of the slot thereby rotating the inner shell until the weight means moves into the lower portion of the slot and simultaneously rotating the closure means in front of the entrance thereby capturing an animal located in the inner shell of the trap.

5. The animal trap of claim No. 4, wherein the weight means comprises a slug, and an elongated rod disposed in the Z-shaped slot is connected to the slug and to the inner shell.

6. The animal trap of claim No. 1, wherein the rear end portion of the outer shell is provided with an additional entrance, the entrances being disposed substantially 180 degrees with respect to each other, an additional closure means is connected to and extends rearwardly from the inner shell, the closure means being disposed substantially 180 degrees from each other.

7. The animal trap of claim No. 1, wherein the means for securing a bait is secured to the means enclosing the front end of the outer shell.

8. The animal trap of claim No. 1, wherein the outer shell and inner shall are cylindrical.

9. The animal trap of claim No. 1, wherein the length of the inner shell is less than the length of the outer shell.

* * * * *